United States Patent [19]

Norton et al.

[11] 4,356,377
[45] Oct. 26, 1982

[54] CUTTING THIN METAL SHEET WITH AN ELECTRON BEAM

[75] Inventors: James F. Norton, Alplaus; Gerald B. Kliman, Schenectady; Russell E. Tompkins, Scotia, all of N.Y.

[73] Assignee: General Electric Company, Schenectady, N.Y.

[21] Appl. No.: 235,811

[22] Filed: Feb. 19, 1981

[51] Int. Cl.³ .............................................. B23K 15/00
[52] U.S. Cl. ....................... 219/121 EH; 219/121 EG
[58] Field of Search ................ 219/121 EB, 121 EM, 219/121 EF, 121 EG, 121 EH, 121 EJ, 121 EK

[56] References Cited

U.S. PATENT DOCUMENTS 4,155,397  5/1979  Honsinger et al. ..................... 164/5
4,187,441  2/1980  Oney ..................................... 310/112
4,328,411  5/1982  Haller et al. ............. 219/121 EB X

*Primary Examiner*—C. L. Albritton
*Attorney, Agent, or Firm*—Donald R. Campbell; James C. Davis, Jr.; Marvin Snyder

[57] ABSTRACT

Amorphous metal ribbon and thin conventional magnetic material is fully cut through by an electron beam and has no or minimal bead on the edge. The ribbon is bent around a roller while under the electron beam and centrifugal force removes molten metal from the cut. An alternative method is to partially cut through and mechanically deform the material to break the thinned section metal bridges remaining below the cut. Motor laminations so cut have negligible increase in thickness and stack compactly.

10 Claims, 9 Drawing Figures

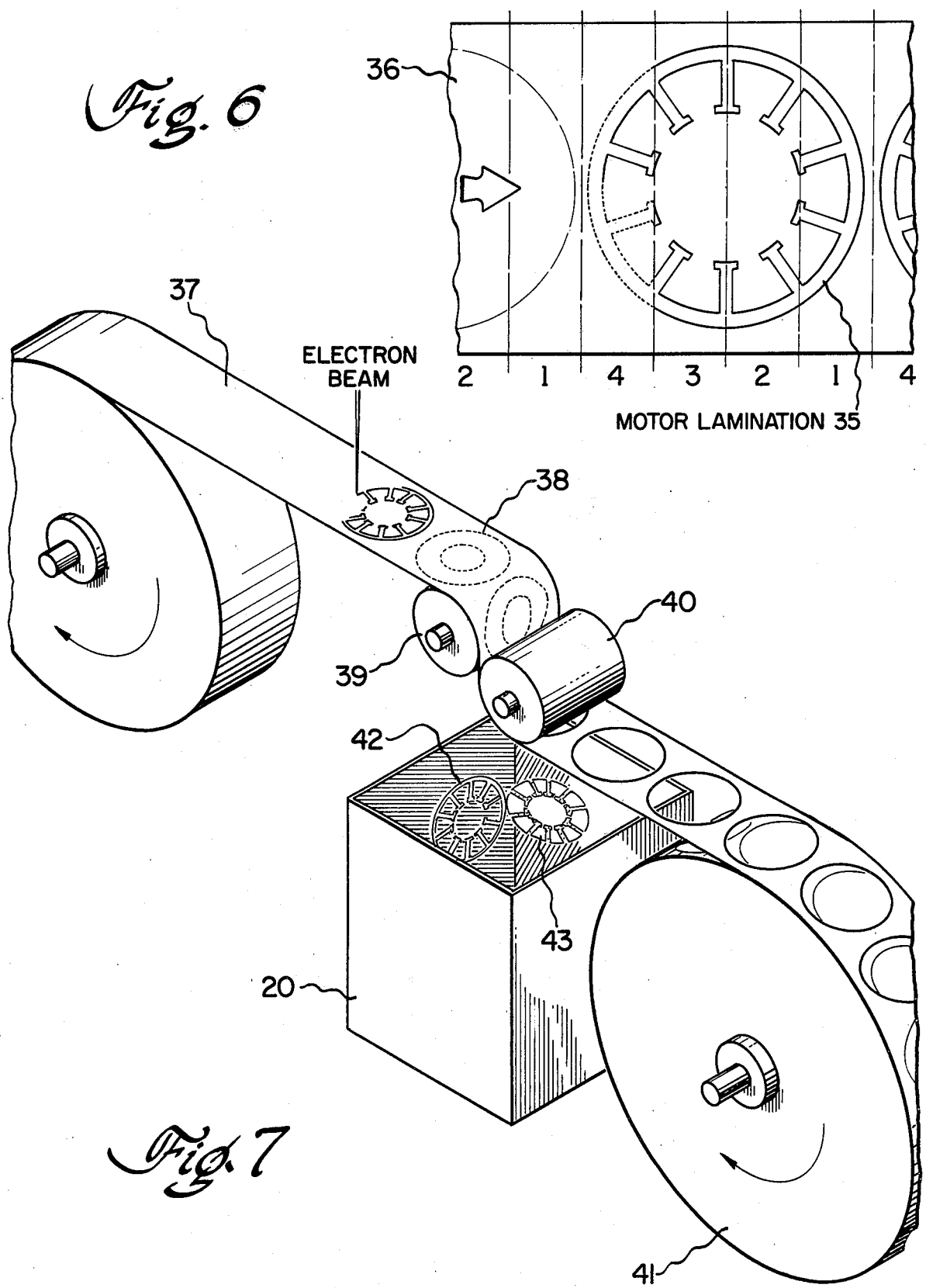

4,356,377

CUTTING THIN METAL SHEET WITH AN ELECTRON BEAM

BACKGROUND OF THE INVENTION

This invention relates to methods of rapidly cutting thin metals without producing a bead or burr on the edge.

Amorphous metals such as the Fe-Si-B-C alloys have dramatically reduced hysteresis losses. When used in electric motors, the efficiency is increased significantly resulting in substantial yearly savings. This material is on the order of ten times thinner than the silicon iron laminations currently in use. Thus, throughput in fabrication might require linear cutting speeds of 6000 ft/min to form the laminations for various motors. The material is brittle and difficult to cut by conventional means.

Electron beam and laser beam cutting of amorphous metal sheet to produce motor laminations is disclosed in copending application Ser. No. 144,538 filed on Apr. 28, 1980 by T. R. Haller, M. G. Jones, G. B. Kliman, and R. E. Tompkins. Local regions of the material are heated above the crystallization temperature without melting it to scribe crystalline lines along which the material fractures upon being mechanically deformed such as by passage through a set of rollers. Since no material is raised above the melting temperature, there is no tendency to form burrs along the cut edge. Stator slot cutting of amorphous metal tape by a laser beam is briefly described in U.S. Pat. No. 4,187,441, W. R. Oney. A process for fabricating shaped laminations directly from the liquid alloy melt is covered by U.S. Pat. No. 4,155,397, V. B. Honsinger and R. E. Tompkins. All of these are assigned to the present assignee.

It is possible to cut completely through thin amorphous metal using electron beams or laser beams, but if this is done the cutting rate was believed to be unacceptably slow in the case of the laser beam and that burrs would form which prevent compact stacking of the shaped laminations. At the instant of cutting (or welding) with an electron beam, surface tension forces will either hold the melted metal in the cut or shape the edge into a circular bead, often much larger than the thickness of the metal. One result would be hum loss, heating, and a larger magnetic core than necessary.

High efficiency motors having cores of conventional magnetic materials would benefit from laminations thinner than the 14 mil and 20 mil steel now available. Even if punch presses are improved to handle such thin strip, the process tends to be tedious and expensive.

SUMMARY OF THE INVENTION

A first method of dealing with the effects of tension forces on molten metal produced in the cut made by a focused electron beam is to melt completely through the entire thickness of the thin metal sheet or ribbon, and move the ribbon along a curved path beneath the electron beam at a high enough speed that centrifugal force throws molten metal out of the cut and away from the surface of the ribbon and allows the edges to solidify with little or no molten metal remaining to form a bead on the edge. The ribbon is bent over a roller below the electron beam, which is deflected to cut out a lamination with the desired shape, and moves at high speeds (such as 6 mph or more). At low speeds there would be insufficient centrifugal force to remove molten metal from the cut. The ratio of beam deflection to material velocity could be on the order of 10 to 1.

A second method is to locally melt more than one-half the thickness of the thin metal and partially cut through the sheet or ribbon along designated lines; the ribbon typically moves horizontally below the electron beam. In this case beads do not form along the edges and surface tension forces the molten metal into thinned section bridges below the cut which may bulge out but do not protrude significantly beyond the surface of the ribbon. When amorphous metal is partially cut the bridge is crystalline material and is fractured by mechanical deformation such as by running the partially cut ribbon through a set of rollers. The lamination and/or unwanted areas are separated from partially cut conventional magnetic metal ribbons by punching. The cut edge, though possibly jaggered, does not significantly increase the thickness of the lamination and prevent compact stacking and is no longer than conventional punching tolerances. Round motor laminations without a bead or burr on the edge are cut by either method.

BRIEF DESCRIPTION OF THE DRAWINGS

FIG. 6 illustrates zones which are sequentially "written on" by an electron beam to make a round motor lamination;.

FIG. 7 is a perspective view of apparatus which partially cuts out round motor laminations from amorphous metal ribbon and deforms the scribed tape to remove the laminations.

DESCRIPTION OF THE PREFERRED EMBODIMENTS

Figure 1:
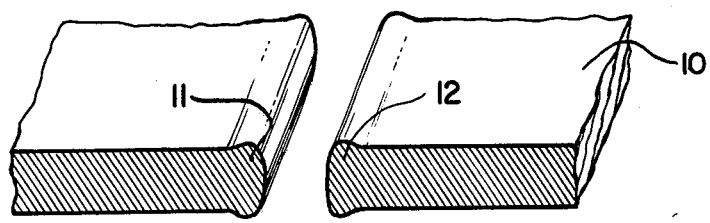
FIG. 1 is a cross section of amorphous metal tape that is fully cut through by an electron beam.
Figure 2:
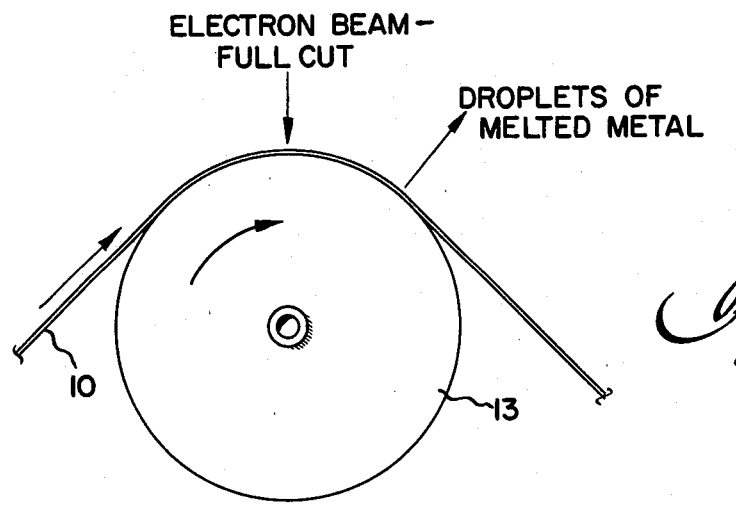
FIG. 2 shows passing the tape over a roller at the time of cutting to remove molten metal from the cut.

The typical cross section of amorphous metal ribbon 10 which is fully cut through by an electron beam, FIG. 1, is characterized by relatively small beads 11 and 12 on the edges of the metal. The bead diameter is only slightly larger than the thickness of the metal, which is approximately 1.5–2 mils. The kerf or width of the cut is as small as 2 mils. When local regions of the entire thickness of the ribbon are heated above the melting temperature and the amorphous metal is melted completely through by a focused electron beam, surface tension forces act on the molten metal to form droplets which may end up on the surface of the ribbon adjacent the cut, and to form a bead with a circular cross section on the edges of the metal, often much larger than the thickness of the metal. Edges with no beads or minimal beads are produced by using centrifugal force at the time of cutting to remove molten metal from the cut. The amorphous metal ribbon 10 passes around a roller 13, FIG. 2, while under the focused electron beam and the centrifugal force acting on the molten metal in the cut is a function of the rotation of the roller. The surface tension forces are overcome, and droplets of molten metal are propelled out of the cut and away from the surface of the moving ribbon, allowing the edges of the cut to freeze with little or no melted material remaining to form a bead. It is known that $A = \omega^2 r$, where A = centripetal acceleration, $\omega$ = angular velocity, and r = radius of roller. If it is assumed that the roller rotates at a given RPM, then a simple expression can be derived for N, the number of times gravity the centrifugal acceleration is.

Figure 3A:
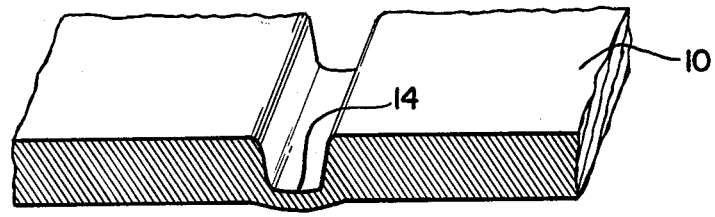
FIGS. 3a and 3b are cross sections of amorphous metal tape that is partially cut by an electron beam and subsequently fractured.
Figure 3B:
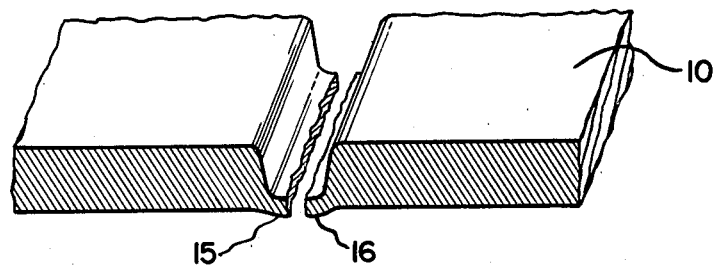
Figure 4:
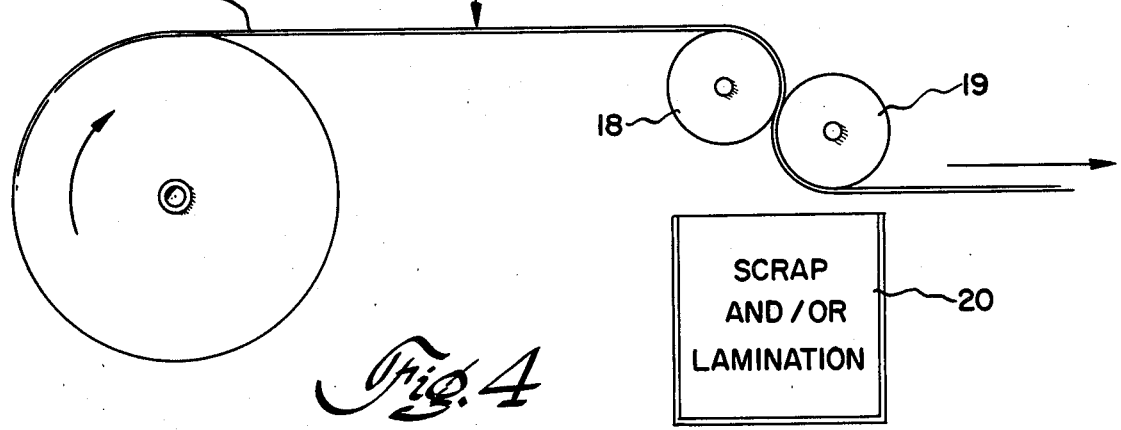
FIG. 4 is a diagram of equipment for the foregoing cutting method.

Another way of dealing with the effects of surface tension on molten metal is to partially cut through the sheet with the electron beam and mechanically deform the material to break the thin section or bridge of metal 14, FIG. 3a, that remains. The electron beam locally melts more than one-half the thickness of the material and preferably 75 to 80 percent, and the melted material is acted on by surface tension forces to form a minimum surface and goes into the bridge below the cut. Some of the melted material may be vaporized. Beads do not form along the edges of the partial cut. An important feature is that the microbridge of metal 14 may bulge out but does not protrude significantly beyond the surface of sheet 10 so that after being broken the jagged edges 15 and 16, FIG. 3b, extend into the cut and do not substantially increase the total thickness of the laminations. If the width of the cut is on the order of 2 mils, the small jagged edge does not present a problem upon stacking the laminations because this is no greater than the usual manufacturing tolerances when conventional magnetic material punched laminations are stacked. Locally melting through the major part of the thickness of an amorphous metal ribbon converts the metal in bridge 14 to crystalline material which is brittle and readily fractures. In FIG. 4, amorphous metal tape 17 is moved along a horizontal path at a high rate of speed as the electron beam is deflected and after being partially cut through is passed between a set of rollers 18 and 19 where the scribed tape is mechanically deformed and the brittle crystalline bridges 14 are fractured, separating the scrap and/or lamination which is collected in a bin 20. The unwanted material which is separated from the desired lamination may be recycled to the liquid alloy melt or employed to fabricate other parts.

In a further application of this invention, thin conventional magnetic metal strip such as silicon iron is rapidly cut with the electron beam by either method. For instance, 6 mil cast silicon steel is fully cut through or is partially cut through and punched. The bulging-out microbridges below the partial cut contain recrystallized metal, but this material is somewhat ductile and is best punched to separate the pieces. Silicon steel can be rolled to as thin as 1 mil and the strip, up to 6–10 mils in thickness, can be cut without substantially increasing the total thickness of the lamination.

Figure 5:
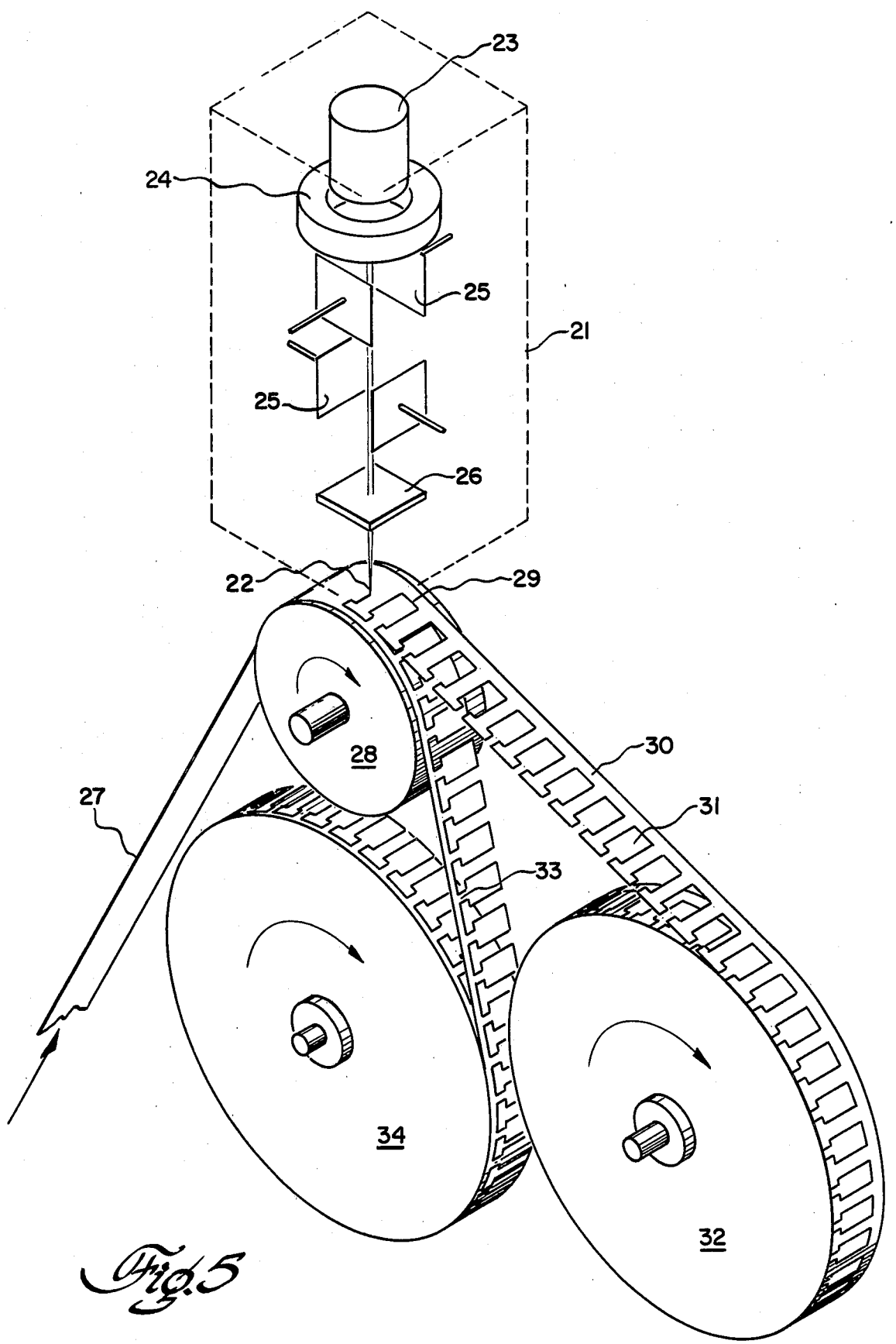
FIG. 5 is a perspective view of an electron beam system and set of rollers for producing a strip of motor laminations and automatically separating the scrap.

FIG. 5 is a more detailed illustration of apparatus for the electron beam full cut process, which may be carried out inside or outside the vacuum chamber. The conventional electron beam system 21 generates a finely focused electron beam 22 and has a source of electrons 23, a beam focusing lens 24, several pairs of orthogonal plates 25 for electrostatically deflecting the focused beam, and a window 26 to pass the electron beam into the atmosphere. Magnetic deflection is also possible and may be preferable. The beam deflection is computer-controlled and the beam is capable of scanning amorphous metal tape 27 at a high rate of speed. The beam is held to a small diameter. Roller 28 has a large enough radius that tape 27 is on the surface of the roller for a while. As tape 27 is drawn over roller 28 and is moving at a high rate of speed, electron beam 22 is deflected to trace out a cut line 29 corresponding to the outline of a strip of stator laminations 30 that has stator slots 31 along one edge. As was explained, droplets of melted metal are thrown off out of the cut and away from the surface of the tape under the action of centrifugal force. The ribbon is divided longitudinally into two parts which are mechanically pulled apart before the molten metals solidifies, and the strip of laminations 30 is wound up on a reel 32 and the excess strip of material 33 is wound up on a separate reel 34. The cutaway, unwanted part of the tape is automatically collected and any microbridges that may be in the cut are torn apart. The bead diameter generally goes down with increased cutting speed. Typical electron beam parameters are that the voltage is 120 kv and the current is 10 ma.

Referring to FIG. 6, a round stator lamination 35 is cut out by zones from a wide strip 36 of amorphous metal or conventional magnetic material. As zone 1 passes beneath the focused beam, it is programmed to cut along the solid lines, and zones 2-4 are sequentially "written on". The zones enter the cutting area and pass over the top of roller 28 one after another, and as each zone travels around the roller centrifugal force sprays molten metal droplets away from the surface and the edges of the cut freeze with no beads or a minimum of beads. Rather than cut around the outline of the round lamination completely and have the piece drop out, small tabs can be left to attach the lamination to the web in several places. At a later point, it is punched out; a crude shaped punch is satisfactory.

Continuous fabrication of round motor laminations from wide amorphous metal ribbon 37 by partial cutting with an electron beam and mechanical deformation is shown in FIG. 7. The beam traces the round lamination pattern 38 (simulated by a doughnut) by zones and melts through approximately 80 percent of the thickness of the material. The microbridges of brittle crystalline metal below the partial cuts are fractured to separate the motor laminations and center pieces from the ribbon and from one another by running the scribed ribbon over and between a pair of rollers 39 and 40 and hence onto a pickup roller 41. The cutout stator laminations 42 stack compactly and the small jagged edge that projects into the air gap and stator slots is of no practical consequence and is removed easily by sand blasting and by inserting coils and insulation into the stator slots. Center pieces 43 can be cut into rotor laminations, returned to the melt, or finely cut into amorphous metal flake.

Figure 8:
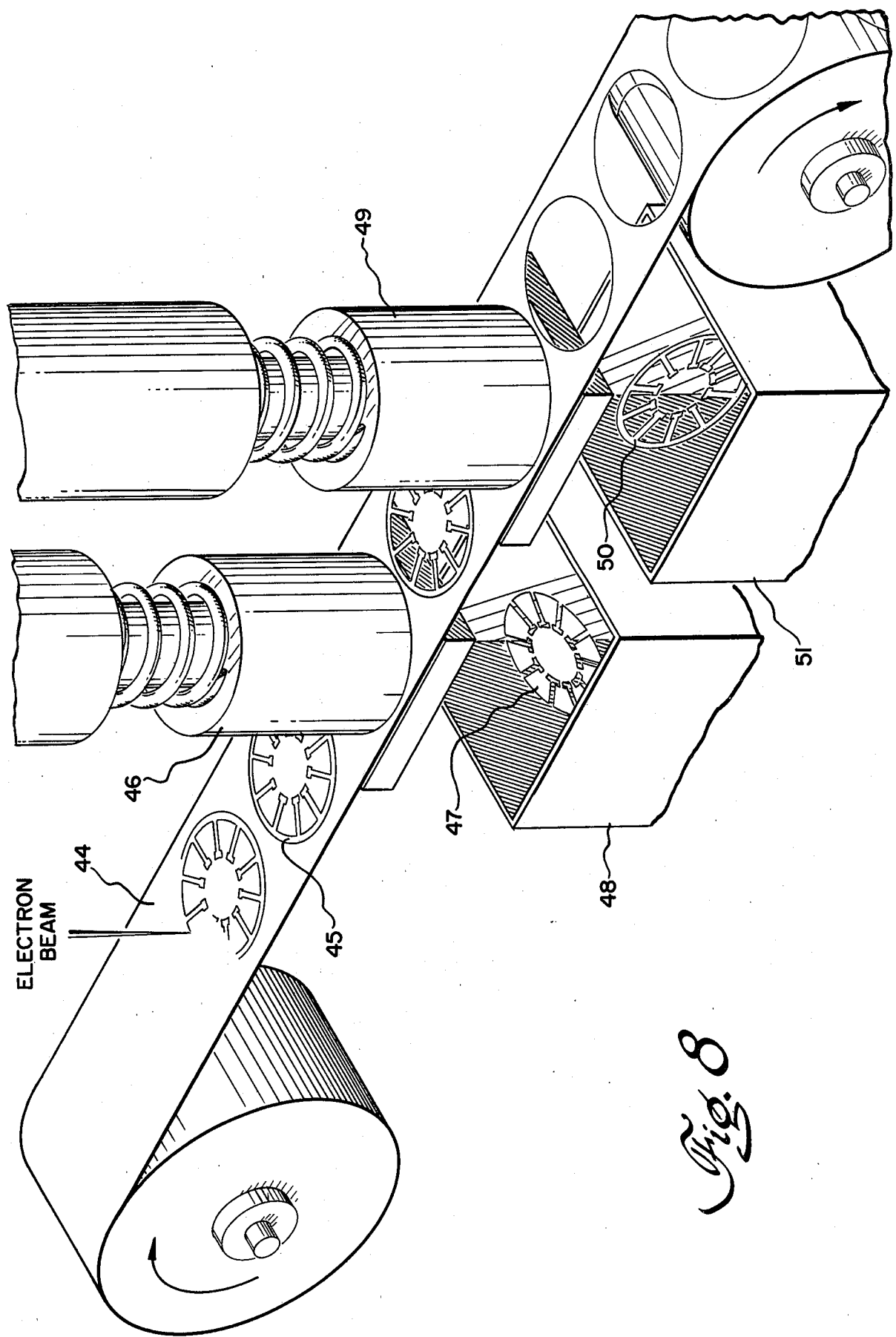
FIG. 8 shows producing round motor laminations from conventional thin magnetic material by electron beam partial cutting and punching.

FIG. 8 shows the partial electron beam cutting and punching of round motor laminations from wide cast silicon iron tape 44. The recrystallized metal below partially cut through patterns 45 is somewhat ductile and is best fractured by punching. At a first station 46, the center pieces 47 are punched out and collected in a bin 48, and at a second station 49 the motor laminations 50 are punched out and separately collected in a bin 51. These may be relatively crude punches and/or made of resilient material. An alternative is to run the scribed tape between rollers which have raised patterns corresponding to the pieces to be separated.

This electron beam cutting method frees the electrical machinery fabricator from standard punchings; to change the lamination pattern, it is only necessary to change the computer program of the electron beam system. A system with plural electron beams, each of which fully cuts through or partially cuts through part of outline, makes the equipment more flexible and allows faster travel of the ribbon. Laser beams cannot be substituted for electron beams because laser energy is reflected by the material and the greater difficulty of deflecting the beam limits the cutting speed to uneconomical rates. The patterning or shaping of the metal tape depends upon the application, and another example is the cutting out of transformer laminations. Amorphous metal magnetic cores do not usually require insulation between the laminations and thus it is important to have a cutting process that is both rapid and does not substantially increase the thickness of the lamination in order to realize high packing factors. There are many magnetic alloy compositions such as $Fe_{80}B_{20}$, $Fe_{82}B_{15}Si_3$, $Fe_{82}B_{13}Si_3C_2$, and $Fe_{40}Ni_{40}P_{14}B_6$; there are also many non-magnetic amorphous metal alloys and these may be more suitable for thin laminations in non-electrical products.

While the invention has been particularly shown and described with reference to preferred embodiments thereof, it will be understood by those skilled in the art that various changes in form and details may be made therein without departing from the spirit and scope of the invention.

The invention claimed is:

1. The method of rapidly cutting thin metal sheet material which comprises:

moving a focused electron beam and said metal sheet relative to one another to heat locai regions of the entire thickness of the material above its melting temperature and produce molten metal and cut through said sheet along designated lines;

said metal sheet moving along a curved path beneath said electron beam and having sufficient centrifugal force to propel molten metal away from the surface of said sheet so that the edges of the cut solidify with no appreciable formation of beads along the cut edges and with negligible increase in the thickness of said metal sheet.

2. The method of claim 1 wherein said metal sheet is bent around a cylindrical roller while under said electron beam.

3. The method of claim 2 wherein said sheet is cut by said electron beam longitudinally into at least two parts which are mechanically pulled apart before the molten metal solidifies.

4. The method of rapidly cutting thin amorphous metal ribbon material which comprises:

moving the amorphous metal ribbon in an arcuate path beneath a focused electron beam that is deflected and locally melts through the entire thickness of the material to produce molten metal and cut through said metal ribbon along lines which result in a lamination with the desired shape;

said metal ribbon moving with sufficient speed that molten metal under the action of centrifugal force is thrown out of the cut and away from the surface of said ribbon so that the edges solidify with no appreciable formation of beads along the cut edges and with negligible increase in the thickness of said lamination.

5. The method of claim 4 wherein said ribbon is bent around a cylindrical roller while under said electron beam.

6. The method of claim 5 wherein said electron beam is controlled to cut out, in sequence, several zones of a round motor lamination.

7. The method of cutting thin metal sheet material which comprises:

moving a focused electron beam and said metal sheet relative to one another to locally melt more than one-half the thickness of the material and partially cut through said metal sheet along designated lines which yield a lamination with the desired shape, leaving thinned section bridges of metal below the cut which do not significantly protrude beyond the surface of said metal sheet; and mechanically deforming said metal sheet to break said bridges of metal and separate the shaped lamination.

8. The method of claim 7 wherein said partially cut through metal sheet is deformed by punching out said shaped lamination and the unwanted material.

9. The method of cutting amorphous metal ribbon material which comprises:

moving the amorphous metal ribbon beneath a focused electron beam that is deflected to locally melt more than one-half the thickness of the material and partially cut through said metal ribbon along designated lines which yield a lamination with the desired shape, leaving thinned section bridges of brittle crystalline metal below the cut which do not significantly protrude beyond the surface of said metal ribbon; and mechanically deforming said metal ribbon to fracture said brittle crystalline bridges and separate the shaped lamination.

10. The method of claim 9 wherein said partially cut through amorphous metal ribbon is deformed by passage through a set of rollers.

* * * * *